3,651,138
RESOLUTION OF DL-DIACETYLLYSINE
Tucker T. Yee, Claymont, Del., and Joseph A. Cahill, Philadelphia, and Joseph A. Meyers III, Springfield, Pa., assignors to Atlantic Richfield Company, New York, N.Y.
No Drawing. Filed Dec. 23, 1969, Ser. No. 887,790
Int. Cl. C07c 101/24
U.S. Cl. 260—534 L     3 Claims

ABSTRACT OF THE DISCLOSURE

Conversion of DL-diacetyllysine to diastereoisomeric salts by reaction with an optically active base such as D-(+)-alphamethylbenzylamine, separation of the salt of the desired L isomer from that of the D isomer by fractional crystallization, conversion of the salt of the L isomer to L-diacetyllysine utilizing a cation exchange resin and finally hydrolysis of the L-diacetyllysine to L-lysine hydrochloride.

BACKGROUND OF THE INVENTION

Field of the invention

This invention relates to a method for obtaining the desired L isomer of lysine from DL-$N^{alpha}$,$N^{epsilon}$-diacetyllysine using an optically active base such as an amine.

Prior art

Several methods for obtaining the desired I isomer of lysine have been reported in the literature, however, these required extraordinary difficult experimental techniques and thus were not feasible on a large scale. In the present method a lysine intermediate is reacted with an optically active base to give a mixture of diastereoisomeric salts which can be separated by fractional crystallization and thereafter the desired L-lysine is produced by hydrolysis. This method is not applicable to DL-lysine itself since lysine is too basic to form a salt with a base such as an amine.

SUMMARY OF THE INVENTION

The present invention involves four steps consisting of:

(1) conversion of DL-diacetyllysine to diastereoisomeric salts by reaction with an optically active base such as D-(+)-alphamethylbenzylamine;

(2) separation of the salt of the desired L isomer from that of the L isomer by crystallization techniques;

(3) passing a solution of the salt of the L isomer of L-diacetyllysine and the D-(+)-alphamethylbenzylamine over a cation exchange resin in the acid cycle to obtain the L-diacetyllysine, and (4) hydrolysis of the thus obtained L-diacetyllysine to L-lysine hydrochloride.

In order to carry out step (2) of the process the salt of the desired L-diacetyllysine and D-(+)-alphamethylbenzylamine was prepared from pure L-lysine·HCl and used for seeding purposes in the crystallization. In addition, such compound also provided knowledge of the specific rotation of the salt so that an indication of the extent of separation of the isomers could be determined when its rotation value was compared to the specific rotation of the solids obtained by the resolution steps.

It is an object of this invention therefore to prepare L-lysine.

It is another object of this invention to resolve DL-diacetyllysine to obtain L-lysine.

It is another object of this invention to provide a method for the preparation of L-lysine from diacetyllysine utilizing an optically active amine.

Other objects of this invention will be apparent from the description of the preferred embodiments and from the claims.

DESCRIPTION OF THE PREFERRED EMBODIMENTS

The DL-$N^{alpha}$,$N^{epsilon}$-diacetyllysine which for convenience is referred to herein simply as DL-diacetyllysine is obtained by the acetylation of DL-lysine, for example, by the method of Fu et al., J. Biol. Chem. 199, 207 (1952) or by the method of Gordon et al., Biochem. J. 37, 82 (1943).

The DL-diacetyllysine thus prepared is reacted with D-(+)-alphamethylbenzylamine in the presence of a water solvent. The D-(+)-alphamethylbenzylamine is available commercially. The reaction is essentially quantitative at room temperature with one mole of the diacetyllysine reacting with one mole of the alphamethylbenzylamine. The water solvent is removed by vacuum evaporation to obtain the solid salt. The following example illustrates this reaction.

EXAMPLE I

There was added to 75 ml. of water contained in a 500 ml. round bottom flask 5.3 grams (0.0435 mole) of D-(+)-alphamethylbenzylamine, reagent grade. The resulting mixture was not a completely homogeneous solution. To this mixture was added at room temperature 10.0 grams (0.0435 mole) of DL-diacetyllysine. There was obtained a homogeneous solution immediately. The water solvent was removed by vacuum evaporation and 15.2 grams of a free flowing solid was obtained consisting of the salt of DL-diacetyllysine and the alphamethylbenzylamine. Since the theoretical yield of the salt is 15.26 grams the actual yield was substantially 100 percent, i.e. the reaction was quantitative.

The salt thus obtained consisted of the DD salt and the DL salt. Since these salts have different solubilities they can be separated by fractional crystallization. Therefore it was necessary to employ seed crystals of the salt of L-diacetyllysine and the D-(+)-alphamethylbenzylamine. The following example shows the preparation of the L-diacetyllysine.

EXAMPLE II

A mixture of 9.1 grams (0.05 mole) of reagent grade L-(+)-lysine·HCl and 16.8 grams (0.2 mole) sodium bicarbonate were dissolved in 150 ml. of water. To this solution was added 18.1 grams (0.1 mole) of p-nitrophenylacetate and 20 ml. of ethyl acetate. The mixture was stirred vigorously for about 16 hours at room temperature. The purpose of adding the ethyl acetate was to aid in the solubilization of the p-nitrophenylacetate. The solution was extracted three times with diethyl ether (100 ml. per treat) and the remaining aqueous solution was treated a second time with 18.1 grams of p-nitrophenylacetate and 8.4 grams of sodium bicarbonate. The aqueous solution containing the L-diacetyllysine sodium salt was again ether extracted in the same manner to remove the p-nitrophenol byproduct and unreacted reagents. Finally, the water solvent was removed by vacuum evaporation.

The residue after the water evaporation was heated to reflux in 200 ml. of absolute alcohol and filtered to remove the insoluble sodium bicarbonate. The filtrate containing the sodium salt of L-diacetyllysine was treated with gaseous hydrogen chloride at 5° C. to convert the sodium salt to L-diacetyllysine.

The acidified filtrate was vacuum evaporated to remove the solvent and the crude L-diacetyllysine was isolated as a viscous liquid.

The following example is provided to show the preparation of the salt of D-(+)-alphamethylbenzylamine and L-diacetyllysine to be used for seeding purposes.

EXAMPLE III

In 100 ml. of water 100 grams (0.0435 mole) of the crude L-diacetyllysine produced in Example II and 10 grams (0.082 mole) of D-(+)-alphamethylbenzylamine were heated to reflux for one hour, cooled to room temperature and extracted with diethyl ether to remove unreacted D-(+)-alphamethylbenzylamine. The aqueous solution was evaporated and 11.2 grams of the crude salt obtained. This crude salt was dissolved in 400 ml. of acetone and recrystallized by allowing the solution to stand for about 16 hours at about 5° C. Upon filtration 5.0 grams of the salt of D-(+)-alphamethylbenzylamine and L-diacetyllysine was obtained. This salt had a specific rotation of (+)9.24 in water solvent using a 1.0 decimeter tube in the polarimeter. This salt had not been reported in the literature and therefore the specific rotation of the pure salt was not known. In order to determine the purity of the salt thus prepared it was converted to L-lysine·HCl which has a known specific rotation. The method employed is set forth in the following example.

EXAMPLE IV

The conversion was carried out by dissolving 5.0 grams of the salt prepared as described in Example III in 100 ml. of water and the solution was passed downwardly through a bed (80 ml.) of a cation exchange resin (trade name, "Amberlyst-15") in the acid (hydrogen) cycle. This procedure exchanged the optically active base onto the resin so that the free L-diacetyllysine was recovered in the effluent. The resin was water-washed and the total volume of effluent was 300 ml. This effluent containing the L-diacetyllysine was refluxed 2 hours with 100 ml. of concentrated hydrochloric acid to hydrolyze the compound to L-lysine·2HCl. Removal of the solvent by vacuum evaporation gave 4.0 grams of crude L-lysine·2HCl. This 4.0 grams of crude L-lysine·2HCl was taken up in 90 ml. of 95 percent alcohol, and heated to reflux while in contact with about 8 ml. of pyridine. This procedure converted the L-lysine·2HCl to L-lysine·HCl. The solution was cooled to about 5° C. and the L-lysine·HCl was recovered by filtration (2.0 grams). The specific rotation of the L-lysine·HCl obtained was found to be (+)19.3, when the solvent consisted of 2 N HCl and a 1 decimeter tube was employed in the polarimeter.

The L-lysine·HCl starting material had a specific rotation of (+)21.03 determined in the same manner thus showing that the L-lysine·HCl recovered as described had a purity of 92 percent (19.3 divided by 21.03 times 100) and, accordingly, the purity of the salt of D-(+)-alphamethylbenzylamine and L-diacetyllysine was also at least 92 percent. This salt had a specific rotation of (+)9.21 with water as the solvent and a 1 decimeter tube.

Another run was made as described in Example III to prepare seed crystals of L-diacetyllysine and D-(+)-alphamethylbenzylamine. The crystals made in this second run had a specific rotation of (+)9.2 and thus also had a purity of at least 92 percent.

The following example shows the fractional crystallization of the salt of DL-diacetyllysine and D-(+)-alphamethylbenzylamine.

EXAMPLE V

An 8.2 gram sample of the salt of DL-diacetyllysine and D-(+)-alphamethylbenzylamine prepared as described in Example I was dissolved in a solvent consisting of 25 ml. of ethanol and 60 ml. of acetone. Seed crystals of the salt of L-diacetyllysine and D-(+)-alphamethylbenzylamine prepared as in the second run described above were added to this solution and the mixture stirred at room temperature for about 3 days but only a small amount of solids (0.5 gram) were produced. The mixture was then cooled to 5° C., stirred for one hour and filtered. There was obtained 2.4 grams of crystals which had a specific rotation of (+)8.25 in water solvent with a 1.0 decimeter tube indicating a purity of 83 percent. This salt was converted to L-lysine·HCl by dissolving 2 grams of the salt in 50 ml. of water and passing the resulting homogeneous solution down through a bed of cation exchange resin in the acid cycle (50 ml.). This resulted in the optically active base D-(+)-alphamethylbenzylamine being exchanged onto the resin while the effluent contained the L-diacetyllysine, excess water being used to wash the resin free of any L-diacetyllysine. It should be noted that the amount of water used to dissolve the salt is not critical except that sufficient water be used to completely dissolve the salt and likewise the amount of resin employed is not critical except that an excess of the resin be used so that its capacity for exchanging the amine is not exceeded. The resin, of course, can be regenerated in the usual manner by washing with a mineral acid solution, preferably hydrochloric acid.

The effluent containing the L-diacetyllysine from the ion exchange step amounting to about 400 ml. of solution was hydrolyzed for about 16 hours with 100 ml. of concentrated hydrochloric acid in order to convert the L-diacetyllysine to L-lysine·2HCl. The amount of concentrated hydrochloric acid is not critical however, it is preferred to use an excess in order to hydrolyze the L-diacetyllysine completely. The L-lysine·2HCl resulting from the hydrolysis step was dissolved in 50 ml. of hot 95 percent alcohol and then refluxed in the presence of 2 ml. of pyridine in order to convert the L-lysine·2HCl to L-lysine·HCl. The solution was cooled to about 5° C. and 0.8 grams of L-lysine·HCl was recovered by filtration. The specific rotation of this solid was (+)17.66 when using 2 N HCl as the solvent and a 1.0 decimeter tube in the polarimeter as compared to a specific rotation of (+)21.03 determined in the same manner for the commercially pure L-lysine·HCl indicating a purity of about 84 percent. In this example as well as in all of the preceding examples a specific rotation was determined as indicated using a Zeiss polarimeter, the D-line of sodium, and a temperature of 25° C.

The solubility of the racemic salt of DL-diacetyllysine and D-(+)-alphamethylbenzylamine in water, ethyl alcohol and isopropyl alcohol is greater than 60 weight percent (at reflux temperature) which prevents these solvents individually from being used for fractional crystallization to separate the DD salt from the DL salt as in Example V.

Consequently in Example V a mixture of ethyl alcohol and acetone was employed as the solvent for fractional crystallization. Acetone alone however cannot be employed as is shown by the following example.

EXAMPLE VI

A saturated solution of the racemic salt prepared as in Example I consisting of 11.8 grams in 400 ml. of acetone was cooled from reflux temperature to room temperature and stirred at room temperature for one hour. There was obtained 6.3 grams of crystals which had a specific rotation of (+)2.77 in water as the solvent using a 1 decimeter tube in the polarimeter indicating a purity of only 27 percent. Obviously such a solvent therefore is not suitable for resolution by fractional crystallization.

It was found that a mixture of ethanol and acetone with the volume ratio of 1 volume of ethyl alcohol to about 2 to 5 volumes of acetone was suitable for the fractional crystallizations as shown in Example V. Preferably the ratio should range from 1 volume of ethyl alcohol to 2.3 to 5 volumes of acetone.

Other mixed solvents can be employed for the fractional crystallization step which is the most critical step of the process. These include other hydroxylated compounds such as water, methyl alcohol or isopropyl alcohol in combination with acetone in about the same ratios of the hydroxylated solvent to the acetone as shown for ethyl alcohol and acetone.

Although the invention has been described using the racemic compound DL-diacetyllysine, other low molecular weight acyl derivatives could be employed, i.e. DL-diacyllysines with some adjustment of the fractional crystallization solvent to compensate for the differences in solubility. Likewise, the invention has been described using the optically active amine D-(+)-alphamethylbenzylamine, however, the method is obviously applicable to the use of other optically active amines such as the L-(−)-alphamethylbenzylamine or any similar optically active amine.

We claim:

1. The method for obtaining L-lysine from DL-$N^{alpha}$, $N^{epsilon}$-diacetyllysine which comprises
   (1) contacting the DL-$N^{alpha}$,$N^{epsilon}$-diacetyllysine with an optically active amine selected from the group consisting of D-(+)-alphamethylbenzylamine and L-(−)-alphamethylbenzylamine to produce the diastereoisomeric salts
   (2) separation of the salt of the desired L-$N^{alpha}$, $N^{epsilon}$-diacetyllysine from the salt of D-$N^{alpha}$, $N^{epsilon}$-diacetyllysine by fractional crystallization from a solvent consisting of 1 volume of a hydroxylated compound selected from the group consisting of water, methyl alcohol, ethyl alcohol and isopropyl alcohol with from 2 to 5 volumes of acetone, said fractional crystallization being initiated by seeding with a pure salt of said optically active amine and L-diacetyllysine
   (3) passing an aqueous solution of the salt of the L-$N^{alpha}$,$N^{epsilon}$-diacetyllysine over a cation exchange resin in the acid cycle to obtain the L-$N^{alpha}$,$N^{epsilon}$-diacetyllysine in the effluent
   (4) hydrolyzing the L-$N^{alpha}$,$N^{epsilon}$-diacetyllysine with hydrochloric acid to produce the L-lysine·2 HCl and
   (5) contacting the L-lysine·2 HCl with pyridine to produce the L-lysine·HCl.

2. The method according to claim 1 wherein the optically active amine is D-(+)-alphamethylbenzylamine.

3. The method according to claim 1 wherein the optically active amine is D-(+)-alphamethylbenzylamine and the solvent in step (2) is ethyl alcohol and acetone.

References Cited

UNITED STATES PATENTS

| | | | |
|---|---|---|---|
| 3,028,395 | 4/1962 | Gillingham | 260—534 L |
| 3,056,799 | 10/1962 | Tullar | 260—534 L |
| 2,556,907 | 6/1951 | Emmick | 260—534 L |
| 2,865,928 | 12/1958 | Fields et al. | 260—534 L |

FOREIGN PATENTS 1,096,365  1/1961  Germany.

LORRAINE W. WEINBERGER, Primary Examiner

J. L. DAVISON, Assistant Examiner

U.S. Cl. X.R.

260—501.11